Oct. 18, 1966     J. J. COWLEY     3,279,925

METHOD OF BREWING BEVERAGE

Filed March 26, 1964     5 Sheets-Sheet 1

Inventor
JOHN JAMES COWLEY
by: *Cavanagh & Norman*

Oct. 18, 1966     J. J. COWLEY     3,279,925
METHOD OF BREWING BEVERAGE

Filed March 26, 1964     5 Sheets-Sheet 2

*Inventor*
JOHN JAMES COWLEY
by: *Cavanagh & Norman*

Oct. 18, 1966    J. J. COWLEY    3,279,925
METHOD OF BREWING BEVERAGE
Filed March 26, 1964    5 Sheets-Sheet 3

Inventor
JOHN JAMES COWLEY
by: Cavanagh & Norman.

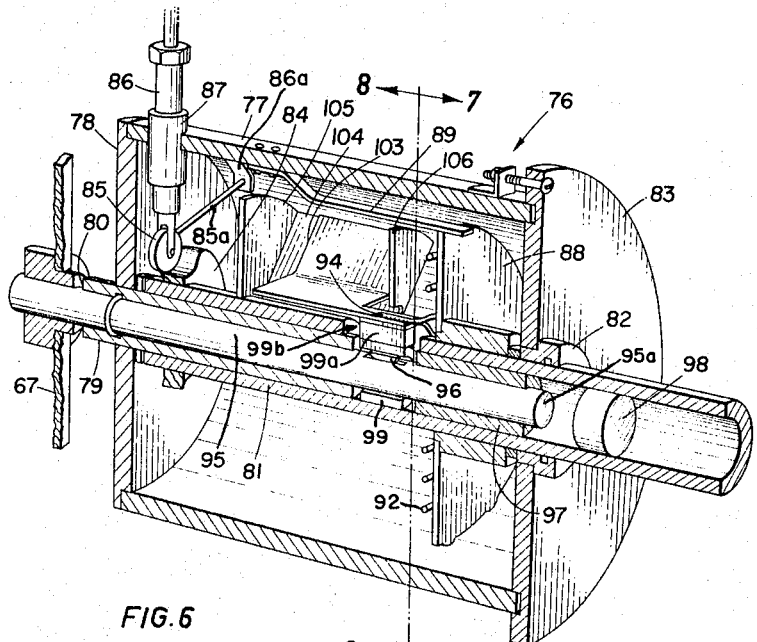
FIG.6
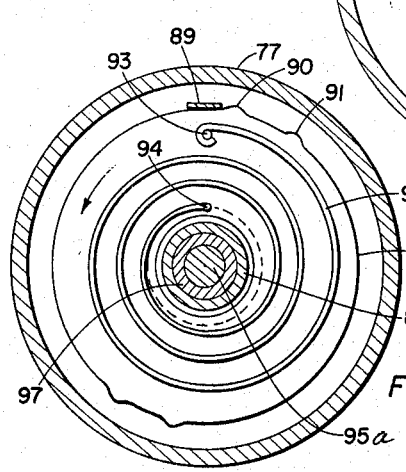
FIG.8a
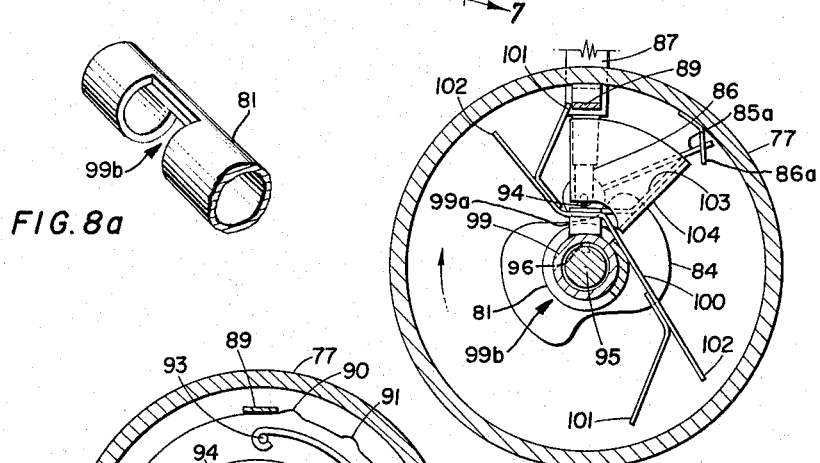
FIG.8
FIG.7
Inventor
JOHN JAMES COWLEY
by: Cavanagh & Norman United States Patent Office 3,279,925
Patented Oct. 18, 1966

3,279,925
METHOD OF BREWING BEVERAGE
John James Cowley, Toronto, Ontario, Canada, assignor to Veko Industries Limited
Filed Mar. 26, 1964, Ser. No. 355,041
4 Claims. (Cl. 99—71)

This invention relates to an improved method and apparatus for brewing a beverage from natural ground coffee beans and tea leaves, and is a continuation-in-part of United States application Serial No. 279,753 filed May 13th, 1963, now abandoned.

In the commercial brewing of ground coffee such as in restaurants and particularly brewed coffee as dispensed by automatic vending machines the element of time in brewing can be of important significance when deciding upon the method of brewing such coffee. Thus, whereas the percolator and dripolator are commonly used in the home such methods would be entirely unsatisfactory in the field of automatically vended coffee. Similar considerations apply to the brewing of tea, which, even in restaurants, commonly requires a delay of five to ten minutes.

Furthermore, such prior apparatus as been suitable for infusing beverages from natural vegetable matter such as tea leaves or coffee beans, has been both expensive and inefficient in operation. On the other hand more economical and reliable devices have generally employed powdered coffee, tea essence or other like synthetic beverage sources, in which the beverage is the result of a solution, or dispersion of such synthetic material, rather than an infusion from the natural vegetable matter, with a consequent loss in flavor and customer satisfaction.

An important aspect of existing apparatus for brewing beverages is found in the fact that many such machines are often expensive to manufacture, thereby being somewhat limited to heavy demand areas, areas of only average or intermittent demand being at the moment mostly unserviced.

Accordingly, it is an object of the present invention to provide a method of brewing a beverage which will result in a reduction in the normal time required for such brewing, the time advantage gained providing a much greater than normal output of automatically vended beverage than has hitherto been the case.

It is a further object of this invention to provide an apparatus for brewing a beverage from natural vegetable matter comprising either natural ground coffee beans or tea leaves that, by novel methods of manufacture and design, may be produced for a comparatively low cost thereby having a wider field of service.

These and other novel features of the invention will be apparent from the following detailed description and accompanying drawings in which like numerals refer to like parts.

In the drawings:

FIGURE 6 is an enlarged cut-away perspective view of the indexing mechanism as illustrated in FIGURE 2;

FIGURE 7 is a section along the line 7—7 in FIGURE 6;

FIGURE 8 is a section along the line 8—8 in FIGURE 6;

FIGURE 8A is a partial perspective view of one member of the device shown in FIGURE 6.

Figure 1:
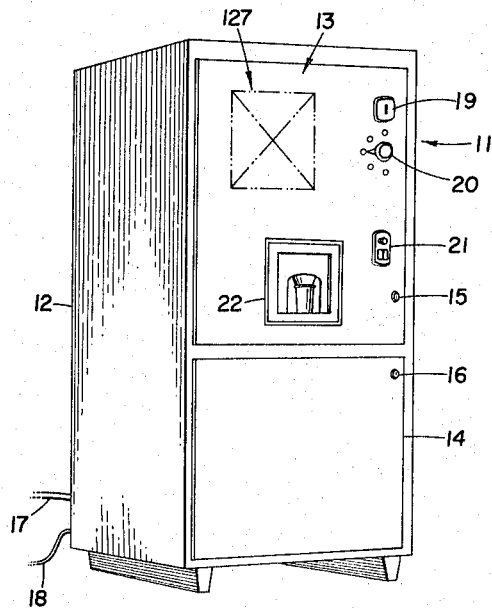
FIGURE 1 is a perspective view of the exterior of a vending machine such as may be used to house the present invention.

Referring to FIGURE 1 a presently preferred embodiment of the present invention is illustrated and comprises a beverage brewing machine indicated generally as 11 having an exterior casing 12 which houses all of the components of the machine and being fitted with upper door 13 and lower door 14 normally secured closed by locks 15 and 16.

A water supply 17 and an electrical supply 18 are connected to casing 12 in order to supply water and electricity for the continuous operation of the machine. All other necessary requirements such as coffee or tea leaves, cream, sugar and vending containers are supplied to the machine intermittently as required all of this being in keeping with conventional good practice in the vending of brewed beverage.

Upper door 13 carries all of the necessary exterior operating devices such as coin slot 19, selector 20, coin return 21 and serving area 22. Lower door 14 is used in servicing the machine such as is required upon removal of supply containers and rinse water storage.

Figure 2:
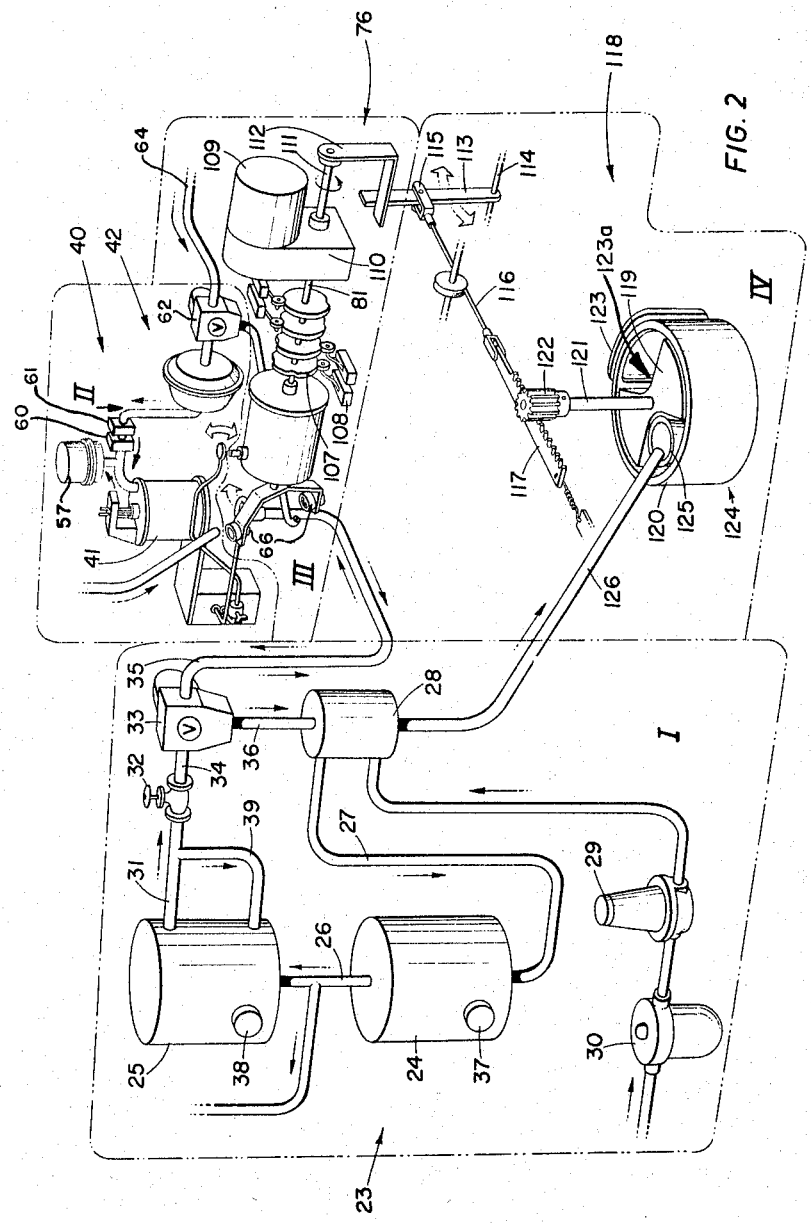
FIGURE 2 is a mechanical schematic diagram of the principal components of the present invention.

Having reference to FIGURE 2, the principal components of the brewing mechanism are illustrated and are grouped under the following headings:

(1) Hot Water Supply and Regulation.
(2) Brewing Chamber Including Pressure Biasing System.
(3) Brewing Cup Indexing Mechanism Including Timing Cam Together With Drive Means Therefor.
(4) Cup Serving Mechanism.

*1. Hot water supply and regulation*

The hot water supply and regulation system indicated generally as 23 in FIGURE 2 comprises pre-warm tank 24 and supply tank 25 being interconnected by piping means 26. Tank 24 is supplied with fresh water through line 27 from heat exchanger 28 which serves to temper incoming water by means which will be described later, supply of water for exchanger 28 coming from regulator 29 which regulates the main supply pressure to a predetermined level, a strainer 30 being also supplied in order to strain out the main impurities often found in domestic water supply systems.

The outlet line 31 from supply tank 25 is provided with a manual flow control means such as valve 32 whereby further control of water flow may be obtained. The final disposition of water from line 31 is regulated by means of solenoid operated valve 33 having inlet line 34 and outlet lines 35 and 36. The valve 33 has a common inlet 34, the outlets 35 or 36 being selectively connected to the inlet by reversing the current through the solenoid portion. In this case outlet line 35 does during a portion of the cycle serve as an inlet line depending upon the particular stage of the complete cycle.

In the presently preferred embodiment, water in tanks 24 and 25 is heated by means of immersion heaters 37 and 38 respectively, the water in tank 24 being heated up to a predetermined level, the final water temperature being reached in tank 25 by means of heater 38. As a further aid in ensuring a reasonably constant temperature of supply water in tank 25 a circulating line 39 is provided whereby cooling taking place in lines 31 and 39 will provide sufficient convection of water therewithin thus ensuring a supply of hot water at a predetermined temperature in line 31 at all times. It will be understood that in normal practice lines 31 and 39 will be insulated, the cooling effects spoken of being negligible but of sufficient amount in normal use to cause some circulation thereby maintaining the desired water temperature in line 31.

2. The brewing chamber

Figure 3:
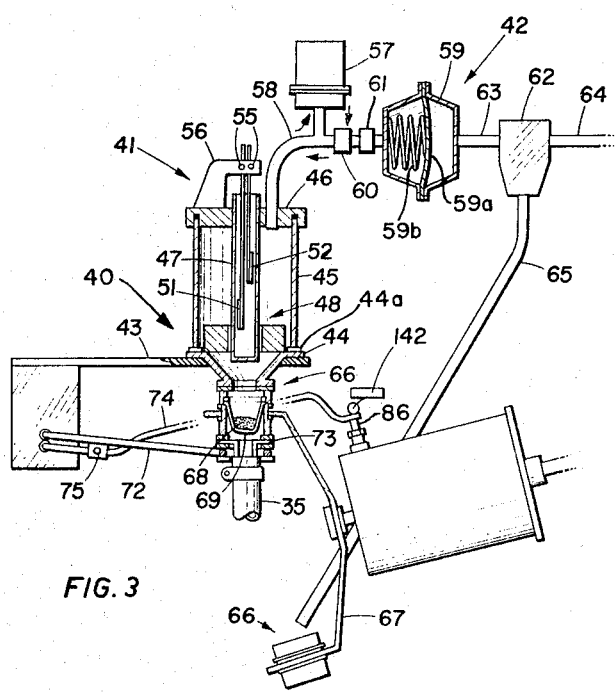
FIGURE 3 is an enlarged sectional view of the brewing chamber as illustrated in FIGURE 2.
Figure 4:
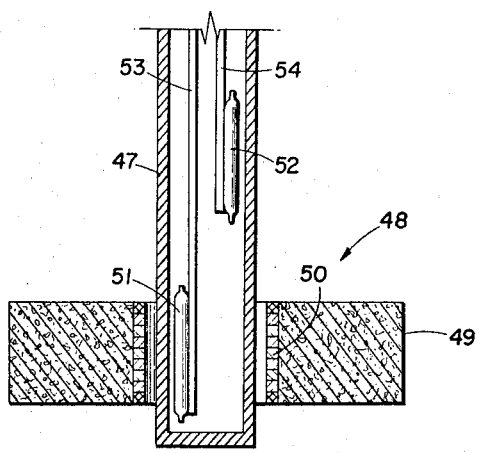
FIGURE 4 is an enlarged view of the float mechanism as illustrated in FIGURE 3.

The brewing chamber and pressure system shown in FIGURE 2 and indicated generally as 40 comprises a brewing chamber 41, further details of which will be seen in FIGURE 3 and FIGURE 4; and the pressure system indicated as 42, further details of this being more apparent in FIGURE 3.

Referring now to FIGURE 3, the brewing chamber 41 comprises a support base 43 having mounted thereon transition piece 44. The upper portion of transition piece 44 has a seal 44A adapted to sealably engage a tubular wall 45 the distal end of wall 45 being closed by means of cap 46.

A guide tube 47 of non-magnetic material is rigidly secured through cap 46 and projecting substantially the length of tubular wall 45 is thus positioned to guide a float assembly indicated as 48 such assembly comprising float 49 and ring magnet 50 as shown in FIGURE 4. Float assembly 48 is free to slide up and down upon tube 47 and thus position magnet 50 along the length of said tube the position being determined by the level of water in chamber 41.

Located within tube 47 are a pair of magnetically operated reed switches 51 and 52 which are adjustable in height position, being so located by means of electrical cables 53 and 54 respectively, cables 53 and 54 being held in position by means of screws 55 on arm 56. In this manner switches 51 and 52 may be located in a desired position to be acted upon by magnet 50 as it is carried at the aforementioned water level.

The pressure biasing system comprises pressure accumulator 57 having for example a conventional compressible bulb therein (not shown) which is in communication with chamber 41 via pipe 58, and pressure booster 59 also in communication therewith through check valve 60 flow being as indicated by the arrow. A second check valve 61 is installed upstream of valve 60 and provides one way communication with atmosphere. One side of booster 59 is connected to a solenoid operated 3-way valve 62 by means of pipe 63. Valve 62 is in turn supplied with water through line 64, line 65 being a drain.

Figure 5:
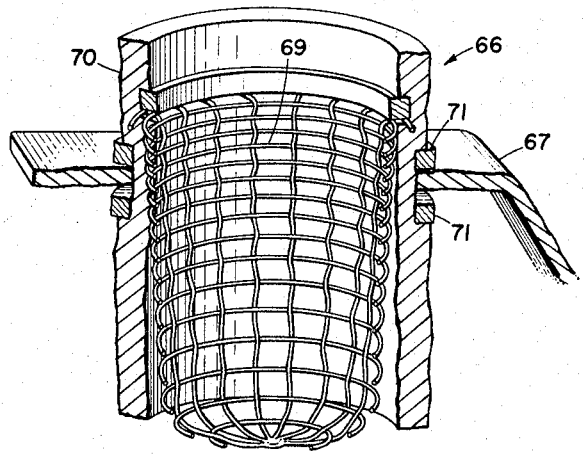
FIGURE 5 is an enlarged cut-away view of the brewing cup as illustrated in FIGURE 3.

In FIGURE 3 a pair of brewing cups indicated generally as 66 are shown mounted upon an arm 67. One cup 66 is shown in the ready to brew position, ground coffee or tea leaves 68 being held in dished screen 69. Further detail of cup 66 is illustrated in FIGURE 5 wherein screen 69 is shown to have a comparatively coarse weave toward the bottom of the dish and a somewhat finer weave toward the rim thereof. A tubular body 70 supports screen 69, body 70 being held somewhat loosely in arm 67 by snap rings 71.

As previously stated one cup 66 is shown in the brew position in FIGURE 3 wherein cup 66 is held thus by lower clamp jaw 72 which supports adaptor 73. Said adaptor has a resilient face in sealable contact with cup 66 while the lower end has hose 35 clamped thereto. An upper clamp arm 74 has a bearing block 75 slidably secured thereon whereby movement of arm 74 upwardly will cause block 75 to bear on jaw 72 and thus clamp cup 66 in place. Movement of arm 74 is accomplished by indexing mechanism indicated as 76 in FIGURE 2 and illustrated in greater detail in FIGURES 6, 7 and 8.

3. Brewing cup indexing mechanism

With reference to FIGURE 6 mechanism 76 comprises shell 77 having end plate 78 rigidly secured to and closing one end thereof. A sleeve bearing 79 is secured centrally of plate 78 and projects therethrough to form a shoulder at 80. Rotatably supported on bearing 79 is a drive shaft 81. The exterior end of shaft 81 projects through a seal bushing 82 located in end cap 83 removably secured to the open end of shell 77 and sealably closing same.

A clamping cam 84 is rigidly secured to the inner end of shaft 81 and bears against a roller 85 rotatably mounted in cam follower 86. Upon rotation of shaft 81 follower 86 through roller 85 reciprocates in guide 87 and on the upstroke clamps lower jaw 72 as heretofore stated. Mechanism 76 is also depicted in FIGURE 3 and it will be seen that the follower 86 is in contact with one end of clamp arm 74 which is thus caused to move upwardly and move jaw 72 by means of block 75.

Also secured to shaft 81 is an indexing cam 88 shown in more detail in FIGURE 7. A flat spring 89 is secured to the inner wall of shell 77 and is moved from an operative to an inoperative position by projections 90 and 91 on cam 88 upon rotation thereof by shaft 81. During rotation of shaft 81 coil spring 92, secured to cam 88 by pin 93, is wound causing tension on inner end 94 in the same direction as said rotation.

A driven shaft 95 is rotatably mounted within bearing 79 and projects therebeyond to support cup arm 67 in rigid attachment. The end 95a of shaft 95 is supported in drive shaft 81 by support bearing 97 and a plug 98 prevents inadvertent removal of bearing 97 as well as providing a seal at this point.

With reference to FIGURE 8 and 8A it will be seen that shaft 95 is keyed by key 96 to a hub 99 which has a projection 99A projecting through a slot 99B in shaft 81 to end in rigid attachment with indexing arm 100 (not shown in FIGURE 6). Slot 99B is formed radially in hollow shaft 81 an amount of approximately three-quarters of the circumference of shaft 81 as shown in FIGURES 8 and 8A affording substantial rotational free play between itself and projection 99A. Arm 100 has four stops 101 and 102 having a predetermined spacing therebetween whereby flat spring 89 will prevent rotation of driven shaft 95 by bearing on stops 101 or 102. Rotation of shaft 95 is caused by end 94 of coil spring 92 being secured to arm 100 and in tension as aforesaid. Upon movement of cam 88 projection 90 causes an upward movement of spring 89 which releases stop 101, spiral spring 92 rotating shaft 95 and thus arm 67 to bring cup 66 into the ready to brew position.

It will be seen that rotation of shaft 95 will be by paddle 103 impinging on paddle stop 104, the liquid within shell 77 and side members 105 and 106 cooperating in the gradual, almost noiseless stopping of shaft 95 as aforesaid. The final position of shaft 95, and thus cup 66, is determined by stop 102 bearing on flat spring 89.

A paddle 103 having a flat configuration is in rigid attachment to projection 99A and is positioned to impinge upon a paddle stop 104 having a similar flat configuration during rotation of said paddle and while said stop, rigidly secured to drive shaft 81, is at rest. In the normal course of operation the space defined by shell 77 is filled with a viscous liquid such as oil whereby movement of paddle 103 is damped and especially so upon paddle 103 coming into contact with stop 104. As a further aid in arresting the forward travel of paddle 103 a pair of side members 105 and 106 are secured to stop 104 which together with paddle 103 forms a type of dashpot to arrest and damp out movement of driven shaft 95.

The exterior extension of shaft 81 supports a number of timing cams thereon as illustrated in FIGURE 2. A first cam 107 together with limit switch 108 constitutes the drive motor limiting device which controls the amount of rotation of drive motor 109 and reduction gearbox 110. In the presently preferred embodiment cam 107 is indexed to operate switch 108 every ninety degrees of rotation of shaft 81.

4. Cup serving mechanism

Having reference to FIGURE 2 it will be seen that the cup serving mechanism is operated by gearbox 110 through a shaft 111 which has double the amount of rotation as shaft 81. Upon rotation of shaft 111 arm 112 is moved arcuately to pivot lever 113 about shaft 114. A clevis 115 and cable 116 are secured to lever 113 and at the other end of said cable a rack 117 is mounted and biased to one end by spring 117A whereby movement of said lever will cause rack 117 to reciprocate.

The cup serving mechanism proper indicated as 118 comprises a quadrant 119 rotatably supported within a frame 120. A shaft 121 is secured centrally of quadrant 119 and supports a spur gear 122 in mesh with rack 117. A spring-loaded door 123 is slidably secured to a frame 120 on suitable tracks for movement about the periphery of frame 120 to open and close an opening indicated as 123A in the frame. A projection (not shown) on quadrant 119 engages with door 123 whereby upon rotation of the quadrant through spur gear 122, door 123 will alternately open and close. A spring (not shown) is to be added to the door in order to aid in closing the door if so desired. A limit switch 124 (not shown) depressed by cup 125 prevents further operation of the machine until the cup has been removed from area 22. The brewed beverage is dispensed into cup 125 from valve 33 by way of tube 126, the cream and sugar being added just before in the conventional manner.

With further reference to FIGURE 1 it is worthwhile to note that upper door 13 may be made from a substantially transparent material through which an animated display, indicated generally as 127, may be viewed. This has the advantage of providing something for a person to look at while the beverage is being brewed and may also be used to carry an advertising message or the like.

Figure 9:
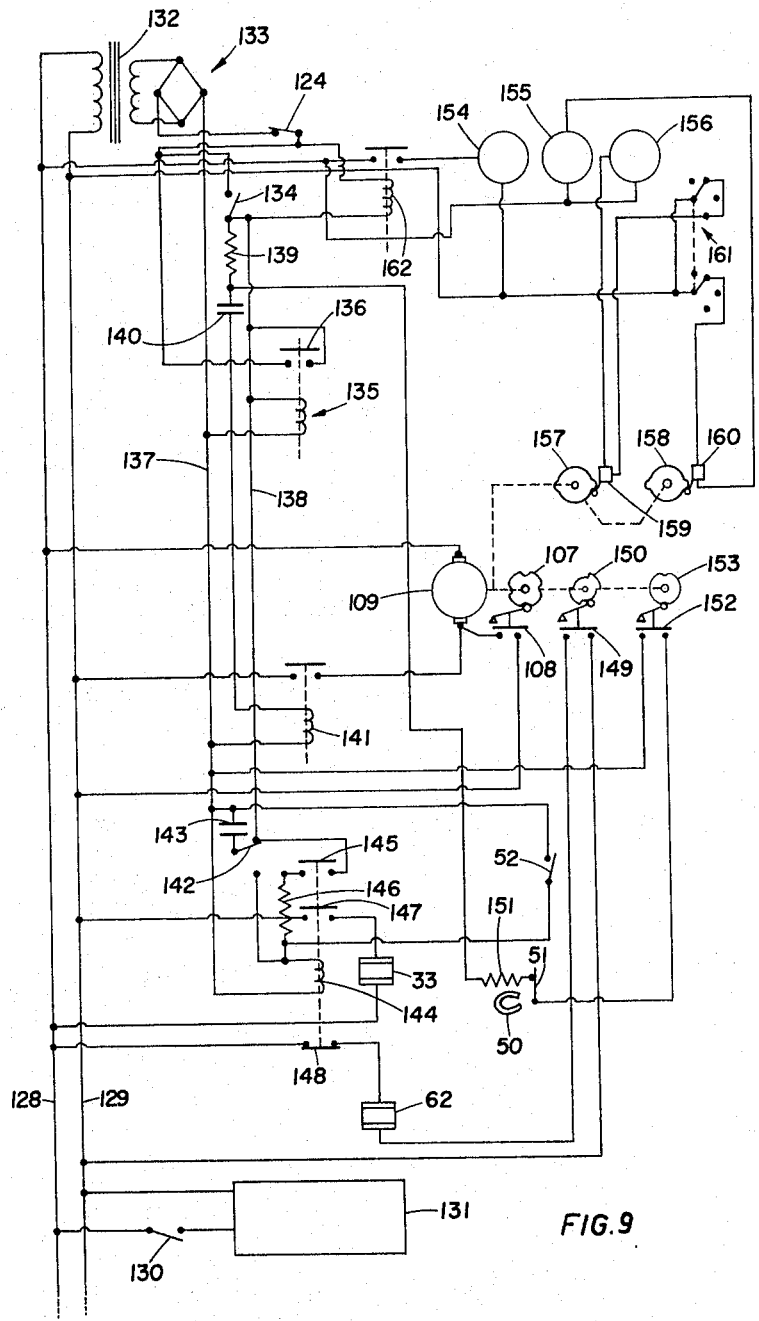
FIGURE 9 is a wiring schematic of the brewing machine according to the present invention.

In operation, the brewing device is controlled through a number of electrical switches, the schematic diagram for which is illustrated in FIGURE 9. With reference to this diagram leads 128 and 129 carry the A.C. power supply through thermostat 130 to the hot water heaters 37 and 38 in tanks 24 and 25 represented by block 131 and also to step-down transformer 132 and rectified 133 to provide D.C. power.

In the normal sequence of operation a coin deposited into coin slot 19 causes a momentary closure of switch 134 thus supplying momentary power to relay 135. The interlock contacts 136 on relay 135 parallel switch 134 and thus supply D.C. power to leads 137 and 138 and through resistance 139 to capacitor 140 through which a current flows to activate relay 141. Current flows until capacitor 140 is charged, this timed closure being long enough to start motor 109 which in turn closes switch 108 by means of cam 107 which continues to supply power to motor 109 after relay 141 has dropped out, motor 109 being operative until switch 108 is opened by dropping into notch on cam 107.

As motor 109 is operated shaft 81 is rotated through gearbox 110 to cause rotation of cam 88 and tensioning of spring 92. Upon movement of cam 88 projection 90 causes an upward movement of spring 89 which releases stop 101, spiral spring 92 rotating shaft 95 and thus arm 67 to bring cup 66 into the ready to brew position.

It will be seen that rotation of shaft 95 will be slowed to the speed of shaft 81 by paddle 103 impinging on paddle stop 104, the liquid within shell 77 and side members 105 and 106 cooperating in the gradual, almost noiseless stopping of shaft 95 as aforesaid. The final position of shaft 95, and thus cup 66, is determined by stop 102 bearing on flat spring 89. Also at this time cam 84 secured to shaft 81 and bearing on roller 85 operates follower 86 to clamp cup 66 between jaws 72 and 74. In FIGURE 6 and FIGURE 8 it will be seen that the follower 86 provided with the roller 85 has a shaft 85A which provides the rotation point for the roller 85, shaft 85A also extending to a pivotal engagement with a bracket 86A whereby the roller 85 and follower 86 may reciprocate vertically the arm 85A preventing twisting of the follower 86 in the guide 87.

Switch 142 is closed by action of follower 86 to discharge capacitor 143 and operate relay 144, the capacitor 143 being previously held charged by connection to the D.C. power leads 137 and 138. The interlock 145 on relay 144 operating through resistor 146 holds relay 144 in during the next portion of the cycle. Contacts 147 on relay 144 operate the brewing solenoid 33 causing hot water from tank 25 to flow through lines 31 and 35 through cup 66 and into the brewing chamber 41.

Water continues to flow into chamber 41 until magnet 50 in float 48 closes upper switch 52. The closing ow switch 52 shorts out power from resistor 146 and thus drops out or de-energizes relay 144 to open the contacts turning solenoid valve 33 off.

During the inflow of water into chamber 41 air pressure is built up within accumulator 57 by compressing the air therein and upon solenoid 33 being de-energized the pressure within accumulator 57 causes reversal of flow within chamber 41 out through line 35 and into heat exchanger 28 via the 3-way valve 33 and thence to line 126. Upon relay 144 returning to the normally inoperative position by the closing of switch 52 contacts 148 are closed which, through switch 149 operated by cam 150, energizes flush solenoid 62. Water from supply line 64 thus flows into booster 56 via line 63 as shown in FIGURE 3 to bias the diaphragm 59A against spring 59B and thus further pressurize the chamber 41, the check valve 60 preventing backflow of pressure and the check valve 61 re-admitting air to the booster 59 upon return of the diaphragm 59A to start position.

It will be understood that the beverage flowing into heat exchanger 28 is substantially above serving temperature, the excess heat from the brewed beverage being taken away by incoming water flowing through line 27 as has been previously stated. Exchanger 28 can be any one of a number of well known types such as are readily available from suppliers of such devices, the only requirement being that it has a dividing wall to keep the water free from the coffee. The brewed beverage then flows from exchanger 28 through line 126 into cup 125 ready to be served.

Magnet 50 in float 48 closes switch 51 toward the bottom of travel of the float which connects one side of capacitor 140 through resistor 151 to line 137 to discharge through relay 141 closing same. Switch 51 is normally closed in the machine at rest position and for this reason limit switch 152 operated by cam 153 is in series to prevent operation of relay 141 except as desired at the aforementioned times.

The said discharge from capacitor 140 produces a timed closure of relay 141 which again starts motor 109. As before motor 109 continues operating until switch 108 is opened by cam 107. During operation of motor 109 in this portion of the cycle spiral spring 92 is further tensioned until shaft 95 is freed to rotate by projection 91 lifting spring 89. In a manner similar as before paddle 103 and stop 104 arrest the rotation of shaft 95, stop 101 again positioning said shaft and thus cup 66 containing spent coffee grounds in the rinse or flush position.

During the latter part of rotation cam 150 opens switch 149 which de-energizes solenoid 62 and the spring loaded diaphragm 59A in booster 59 forces the flush water via line 65 over cup 66, rinsing same, the check valve 61 admitting air to booster 59 and check valve 60 preventing flow of air from chamber 41.

As has been previously stated the dispensing of ground coffee or tea leaves, cream, and sugar are carried out in the conventional manner these dispensers being 154, 155 and 156 respectively in FIGURE 9.

The cream and sugar dispensers are operated by cams 157 and 148 closing switches 159 and 160. Gang switch 161 is used as a selector to give a beverage with or without cream and sugar. The dispenser 154 is initiated by relay 162 which receives a momentary pulse from switch 134.

From the foregoing it will be apparent that the instant invention comprises a method of brewing a beverage comprising the steps of flowing water under pressure through ground coffee or tea leaves and reversing the flow responsive to a predetermined amount of water and utilizes a chamber containing a float together with switch means operable by said float to cause said flow reversal.

While a preferred embodiment of this invention has been disclosed various alterations in design are contemplated, such alterations however being within the scope of the appended claims.

What I claim is:

1. A method of brewing a beverage from tea, coffee and the like infusable beverage matter and water at an elevated brewing temperature comprising the steps of: flowing said water upwardly through said beverage matter into a chamber to form a brewing mixture and displacing air therefrom; accumulating said air under back-pressure; pressurizing said resultant mixture by said back-pressure generated by said mixture; generating a signal responsive to a predetermined volume of said mixture in said chamber; utilizing said upward signal to terminate said flow, and simultaneously permit downward reverse flow; said mixture forming a brewed beverage during said upward and downward flow and, simultaneously straining said beverage matter from the resultant brewed beverage during said downward flow.

2. The method as claimed in claim 1 including the step of regulating the rate of upward flow of said water.

3. The method as claimed in claim 1 including the step of applying additional water pressure to supplement said accumulated air pressure.

4. The method as claimed in claim 3 including the step of accumulating said additional water pressure under back pressure; subsequently releasing said accumulated water pressure and flushing said beverage matter therewith.

References Cited by the Examiner
UNITED STATES PATENTS
3,031,947  5/1962  Heuckeroth _____ 99—283

A. LOUIS MONACELL, *Primary Examiner.*

M. W. GREENSTEIN, *Assistant Examiner.*